(12) United States Patent
Kaushik et al.

(10) Patent No.: US 10,981,433 B2
(45) Date of Patent: Apr. 20, 2021

(54) METHOD AND SYSTEM FOR PERSONALIZED THERMAL COMFORT OF OCCUPANTS IN A VEHICLE AND VEHICLE IMPLEMENTING THE METHOD

(71) Applicant: GM GLOBAL TECHNOLOGY OPERATIONS LLC, Detroit, MI (US)

(72) Inventors: Shailendra Kaushik, Novi, MI (US); Taeyoung Han, Bloomfield Hills, MI (US); Bahram Khalighi, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 220 days.

(21) Appl. No.: 16/374,811

(22) Filed: Apr. 4, 2019

(65) Prior Publication Data

US 2020/0317024 A1    Oct. 8, 2020

(51) Int. Cl.
*B60H 1/00* (2006.01)

(52) U.S. Cl.
CPC ....... *B60H 1/00742* (2013.01); *B60H 1/0073* (2019.05); *B60H 1/00564* (2013.01); *B60H 1/00792* (2013.01); *B60H 1/00971* (2013.01)

(58) Field of Classification Search
CPC .............. B60H 1/00742; B60H 1/0073; B60H 1/00792; B60H 1/00564; B60H 1/00971; B60H 1/00735
See application file for complete search history.

(56) References Cited

U.S. PATENT DOCUMENTS

| | | | | |
|---|---|---|---|---|
| 6,892,808 | B2* | 5/2005 | Remond | B60H 1/0073 165/203 |
| 10,836,234 | B2* | 11/2020 | Patil | B60H 1/00742 |
| 2002/0125334 | A1* | 9/2002 | Remond | B60H 1/0073 236/91 C |
| 2020/0156435 | A1* | 5/2020 | Patil | B60H 1/00742 |

* cited by examiner

*Primary Examiner* — Jon T. Schermerhorn, Jr.

(74) *Attorney, Agent, or Firm* — Lorenz & Kopf, LLP

(57) ABSTRACT

Methods and systems are provided for personalized controlling of an air temperature in a vehicle. A computer implemented method for personalized controlling of an air temperature in a vehicle comprises determining, by a processor, a current temperature condition in the vehicle, wherein the current temperature condition in the vehicle is determined based on at least a temperature value that is representative for a current thermal environment in a compartment of the vehicle. The processor further determines a basal metabolic rate that is associated with a person located in the compartment of the vehicle and controlling, by the processor, a desired air temperature in the vehicle, wherein the desired air temperature is controlled based on the determined current temperature condition in the vehicle and the determined basal metabolic rate.

20 Claims, 7 Drawing Sheets

METHOD AND SYSTEM FOR PERSONALIZED THERMAL COMFORT OF OCCUPANTS IN A VEHICLE AND VEHICLE IMPLEMENTING THE METHOD

INTRODUCTION

The technical field generally relates to temperature and air flow rate control systems in vehicles, and more particularly relates to a method and a system for personalized controlling of an air temperature in a vehicle to provide personalized thermal comfort to occupants of the vehicle as well as to a vehicle implementing the method.

Temperature control or regulation systems in vehicles have achieved great importance due to an increasing demand for passenger comfort inside the vehicle. Most of the temperature control systems involve a manual or automated regulation of temperature parameters for separate units, entities or regions inside the vehicle. For example, some temperature control systems include the possibility to regulate the seat temperature or the temperature of the steering wheel. Other temperature control systems provide the possibility for temperature regulation according to a predetermined temperature regulation program to optimize energy consumption of the vehicle, for example, based on specific environmental parameters. However, most of these temperature control systems rely on an air temperature in the vehicle based on which a regulation of the temperature may be carried out and thus do not consider any personal factors of the passengers using the temperature control systems.

Accordingly, it is desirable to take into account personal factors of passengers inside a vehicle for controlling the air temperature in the vehicle in order to increase the individual thermal comfort of the passengers. In addition, it is desirable to adapt the temperature control system of the vehicle to the personal thermal comfort needs of each individual passenger. Furthermore, other desirable features and characteristics of the present invention will become apparent from the subsequent detailed description and the appended claims, taken in conjunction with the accompanying drawings and the foregoing technical field and background.

SUMMARY

A computer implemented method for personalized controlling of an air temperature in a vehicle is provided. The method comprises determining, by a processor, a current temperature condition in the vehicle, wherein the current temperature condition in the vehicle is determined based on a temperature value that is representative for a current thermal environment in a compartment of the vehicle. The method further comprises determining, by the processor, a basal metabolic rate that is associated with a person located in the compartment of the vehicle and controlling, by the processor, a desired air temperature in the vehicle, wherein the desired air temperature is controlled based on the determined current temperature condition in the vehicle and the determined basal metabolic rate.

In an exemplary embodiment, the processor determines the basal metabolic rate based on a parameter corresponding to a physical property of the person.

In an exemplary embodiment, an information of a physical property of the person is received via a user interface and the processor determines the basal metabolic rate associated with the person using the received information of the physical property of the person.

In an exemplary embodiment, the basal metabolic rate associated with the person is determined based on a gender of the person.

In an exemplary embodiment, the basal metabolic rate associated with the person is determined based on an age of the person.

In an exemplary embodiment, the basal metabolic rate associated with the person is determined based on a weight of the person.

In an exemplary embodiment, the basal metabolic rate associated with the person is determined based on a height of the person.

In an exemplary embodiment, the processor further determines an amount of heat energy emitted by the person located in the compartment of the vehicle, wherein the desired air temperature in the vehicle is further controlled based on the determined amount of heat energy emitted by the person.

In an exemplary embodiment, the amount of heat energy emitted by the person is determined based on an information of a work done by a movement of the person.

In an exemplary embodiment, the processor determines the amount of energy emitted by the person using a clothing information associated with the person, wherein the clothing information associated with the person is determined using one of a clothing temperature information, a clothing insulation information and an information about a clothing-specific heat transfer coefficient, wherein the processor determines the amount of energy emitted by the person using the clothing information by: receiving an input from the person via an input unit, wherein the input is indicative for a clothing type worn by the person; or using a default setting for the clothing information, if no input is received from the user via the input unit or if the input from the person is invalid.

In an exemplary embodiment, the processor estimates a personalized indicator for the person, the personalized indicator being indicative of a thermal comfort perceived by the person, wherein the personalized indicator is determined based on the determined basal metabolic rate that is associated with the person located in the compartment of the vehicle, wherein the processor controls the desired air temperature in the vehicle based on the estimated personalized indicator.

In an exemplary embodiment, the processor determines the temperature value that is representative for the current thermal environment in the compartment of the vehicle using a mathematical model that is based on a heat balance of the compartment of the vehicle.

In an exemplary embodiment, controlling the desired air temperature in the vehicle results in an adjustment of the desired air temperature in the compartment of the vehicle, wherein the adjusted desired air temperature in the compartment of the vehicle provides a basis for again determining, by the processor, a current temperature condition in the vehicle such that a closed-loop temperature control in the vehicle is provided.

In an exemplary embodiment, the processor divides the compartment of the vehicle into a first temperature zone and a second temperature zone within the vehicle. The processor determines a first basal metabolic rate that is associated with a first person located in the first temperature zone of the vehicle and a second basal metabolic rate that is associated with a second person located in the second temperature zone of the vehicle. The processor controls a first desired air temperature in the first temperature zone of the vehicle based on the determined first basal metabolic rate of the first person located in the first temperature zone of the vehicle and the determined current temperature condition in the vehicle. The processor further controls second desired air temperature in the second temperature zone of the vehicle based on the determined second basal metabolic rate of the second person located in the second temperature zone of the vehicle and the determined current temperature condition in the vehicle.

A system for personalized controlling of an air temperature in a vehicle is provided. The system comprises a non-transitory computer readable medium that stores user entered parameters associated with one of a weight of a person, a height of the person, an age of the person and a gender of the person. The system further comprises a processor configured to determine a current temperature condition in the vehicle, wherein the current temperature condition in the vehicle is determined based on a temperature value that is representative for a current thermal environment in a compartment of the vehicle, to determine a basal metabolic rate that is associated with a person located in the compartment of the vehicle, and to control a desired air temperature in the vehicle, wherein the desired air temperature is controlled based on the determined current temperature condition in the vehicle and the determined basal metabolic rate.

In an exemplary embodiment, the processor is further configured to determine the basal metabolic rate based on a physical property of the person, wherein data for the physical property of the person is obtained from the non-transitory computer readable medium which has the user entered parameters stored thereon when a temperature control of the vehicle is activated.

In an exemplary embodiment, a data storage device coupled to the vehicle and the processor is further configured to determine the basal metabolic rate based on the physical property of the person, wherein data for the physical property of the person is obtained from the non-transitory computer readable medium if such data is available on the non-transitory computer readable medium, and wherein data for the physical property of the person is obtained as default data from the data storage device if data for the physical property of the person is not available on the non-transitory computer readable medium.

In an exemplary embodiment, the processor is further configured to determine an amount of heat energy emitted by the person into the compartment of the vehicle.

In an exemplary embodiment, the processor is further configured to determine the amount of heat energy emitted by the person based on an information of a work done by a movement of the person and a clothing information associated with the person, wherein the clothing information associated with the person is determined using one of a clothing temperature information, a clothing insulation information and information about a clothing-specific heat transfer coefficient.

A vehicle having a processor is provided. The processor is configured to determine a current temperature condition in the vehicle, wherein the current temperature condition in the vehicle is determined based on a temperature value that is representative for a current thermal environment in a compartment of the vehicle. The processor is further configured to determine a basal metabolic rate that is associated with a person located in the compartment of the vehicle and to control a desired air temperature in the vehicle, wherein the desired air temperature is controlled based on the determined current temperature condition in the vehicle and the determined basal metabolic rate.

BRIEF DESCRIPTION OF THE DRAWINGS

The exemplary embodiments will hereinafter be described in conjunction with the following figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module and/or system refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
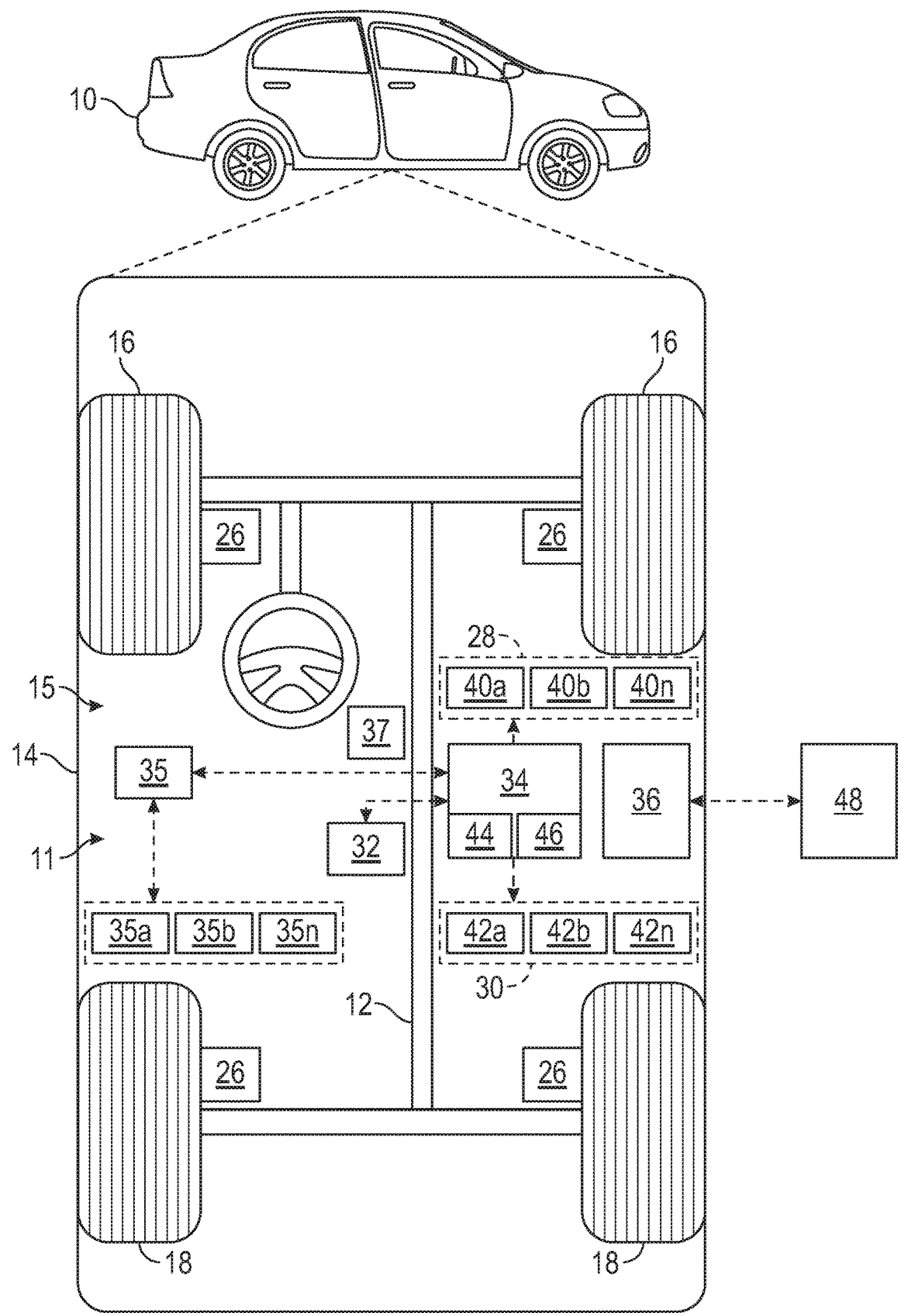
FIG. 1 is a vehicle having a system for personalized controlling of an air temperature in the vehicle in accordance with an embodiment.

With reference to FIG. 1, a vehicle 10 is shown in accordance with various embodiments. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near a respective corner of the body 14. The body 14 includes or defines a compartment 15 of the vehicle 10.

As shown, the vehicle 10 generally includes a propulsion system 20, a transmission system 22, a steering system 24, a brake system 26, a sensor system 28, an actuator system 30, at least one data storage device 32, at least one controller 34, an input unit 35 and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. One or more of the sensing devices 40a-40n may, for example, sense an air temperature in the vehicle 10. The sensing devices 40a-40n can include, but are not limited to, radars, lidars, global positioning systems, optical cameras, thermal cameras, ultrasonic sensors, temperature sensors and/or other sensors. The actuator system 30 includes one or more actuator devices 42a-42n that control one or more vehicle features such as, but not limited to, the propulsion system 20, the transmission system 22, the steering system 24, and the brake system 26. Furthermore, the actuator devices 42a-42n can control a temperature regulation system 37 of the vehicle 10. In various embodiments, the vehicle 10 features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In various embodiments, the data storage device 32 stores defined maps of the navigable environment. In various embodiments, the defined maps may be predefined by and obtained from a remote system. For example, the defined maps may be assembled by the remote system and communicated to the autonomous vehicle 10 (wirelessly and/or in a wired manner) and stored in the data storage device 32. The data storage device 32 may have stored biometric data of a person and/or a personalized temperature program for the person. As can be appreciated, the data storage device 32 may be part of the controller 34, separate from the controller 34, or part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10, in particular, a personalized controlling of a temperature in the vehicle 10.

The instructions may include one or more separate programs, each of which comprises an ordered listing of executable instructions for implementing logical functions. The instructions, when executed by the processor 44, receive and process signals from the sensor system 28 and/or input unit 35, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, the controller 34 and/or the processor 44 implements machine learning techniques to assist the functionality of the controller 34 and/or the processor 44, such as feature detection/classification, obstruction mitigation, route traversal, mapping, sensor integration, ground-truth determination, and the like.

In an exemplary embodiment, the actuators 42 include a temperature control. The temperature control may, for example, be executed by a temperature and/or air flow rate control system 37 as illustrated in FIG. 1.

The input unit 35 includes at least one or more input devices 35a-35n, such as but not limited to, a display, a keypad, a voice recognition and an object recognition. The input device 35 is configured for receiving an input from person, e.g., a passenger, user or occupant of the vehicle 10. The person can input data, for example personal data, biometric data and/or environmental data, via the input unit 35. For example, the person can input information about a basal metabolic rate associated with the person. The input unit 35 is coupled wirelessly and/or in a wired manner with the controller 34 and with the processor 44 which can be a part of the controller 34 or vice versa.

The processor 44 and/or the controller 34 is coupled wirelessly and/or in a wired manner with the actuator system 30 including one or more actuator devices 42a-42n. The actuator devices 42a-42n may include one or more temperature control devices 37 for controlling the temperature, in particular a desired air temperature inside the vehicle 10. The temperature control devices 37 may include a heating element and/or an air flow regulator. The processor 44 may thus control an automated climate control (ACC) of the vehicle 10.

The processor 44 determines a current temperature condition in the vehicle 10, wherein the current temperature condition in the vehicle 10 is determined based on at least a temperature value that is representative for a current thermal environment in the compartment 15 of the vehicle 10. The processor 44 determines a basal metabolic rate associated with the person located in the compartment 15 of the vehicle 10, wherein the basal metabolic rate may be representative for an amount of energy generated, in particular emitted, by the person. The processor 44 controls a desired air temperature in the vehicle 10, wherein the desired air temperature is controlled based on the determined current temperature condition in the vehicle 10 and the determined basal metabolic rate.

The current temperature condition in the vehicle 10 may be indicative of an air temperature in the vehicle 10. The temperature condition in the vehicle 10 may be based on a temperature value, the so-called equivalent homogeneous temperature $T_{EHT}$ or EHT. This temperature value $T_{EHT}$ can be a calculated by processor 44 and describes a current thermal environment of the vehicle 10. The mathematical model that is the basis for determining $T_{EHT}$ will be described in more detail below.

The basal metabolic rate may be a specific value or parameter that is determined based on at least a physical property of the person or on at least a parameter corresponding to a physical property of the person. Such values or parameters for the physical property may be input, i.e. entered by the person itself via a user interface. In particular, the basal metabolic rate associated with the person is determined based on at least one of a gender of the person, an age of the person, a weight of the person and a height of the person. The basal metabolic rate may thus represent biometric data of a specific person. The basal metabolic rate of a person influences a heat generation and thus a heat emission of the person, but also has an influence on the temperature perception by the person and therefore the thermal comfort of the person. The basal metabolic rate (M or BMR) may be defined as the amount of energy per unit time that a person needs to keep the body functioning at rest. This energy may appear as a heat energy that is emitted by the resting person into the environment, for example into the vehicle 10.

The processor 44 can further estimate or determine a personalized indicator for the person, which personalized indicator is indicative of a thermal comfort perceived by the person. The personalized indicator may be determined based on at least the determined basal metabolic rate that is associated with the person located in the compartment of the vehicle 10. Further parameters like an activity level, i.e. a work done by the person or a clothing information also influences the thermal comfort perceived by the person. The processor 44 controls the desired air temperature in the vehicle 10 based on this estimated personalized indicator and thus also based on the basal metabolic rate of the person. The personalized indicator which can be determined based on the basal metabolic rate of the person can be defined by a so-called predicted mean vote (PMV) which is determined with the following equation:

$$PMV = (0.303 e^{-0.036M} + 0.028) * \{(M-W) - 3.05*10^{-3} * [57733 - 6.99*(M-W) - P_a] - 0.42*[(M-W) - 58.15] - 1.7*10^{-5} * M * (5867 - P_a) - 0.0014 * M * (34 - EHT) - 3.96*10^{-8} * f_{cl} * [(t_{cl}+273)^4 - (EHT+273)^4]] - f_{cl} * 3.5 * (t_{cl} - EHT)\},$$

where $t_{cl} = 35.7 - 0.028*(M-W) - I_{cl} * \{3.96*10^{-8} * f_{cl} * [(t_{cl}+273)^4 - (EHT+273)^4] \, f_{cl} * h_c * (t_{cl} - EHT)\}$, where:
M represents Metabolic Rate of the person,
W represents Work done by the person,
$t_{cl}$ represents Clothing Temperature,
$I_{cl}$ represents Clothing Insulation,
$h_c$ represents Convection Heat Transfer Coefficient,
EHT represents Equivalent Homogenous Temperature,
$f_{cl}$ represents Ratio of Clothed Surface Area to Nude Surface Area ($A_{cl}/A_D$),
Pa represents Water Vapor Pressure.

The personalized indicator which can be determined based on the basal metabolic rate of the person can also be defined by a percentage of people dissatisfied (PPD) which is determined based on the PMV as follows:

$$PPD = 100 - 95 * \exp(-(0.03353 * PMV^4 + 0.2179 * PMV^2)),$$

where: "exp" is the Euler's number "e".

The PMV and PPD are indicative of the personal thermal comfort of the person in the vehicle 10. PMV and/or PPD can represent the personalized indicator of the person. PMV and/or PPD may also represent a basis for estimating the personalized indicator of the person. Their estimation takes into account both environmental and personal factors of the person. The PMV and thus also the PPD include the basal metabolic rate of the person, i.e., a body heat generation in resting, an activity level of the person and a clothing level of the person, i.e., a clothing information. By using PMV and PPD, instead of breath air temperature as feedback variable in a temperature and/or air flow rate control system, an improved personalized thermal comfort to all occupants in a vehicle 10 can be provided. This applies for both dual zone concepts having two separately controllable temperature zones and for quad zone concepts having four separately controllable temperature zones in the vehicle 10. The different parameters used for determining the PMV and PPD will be explained with reference to the following exemplary embodiments.

Figure 2:
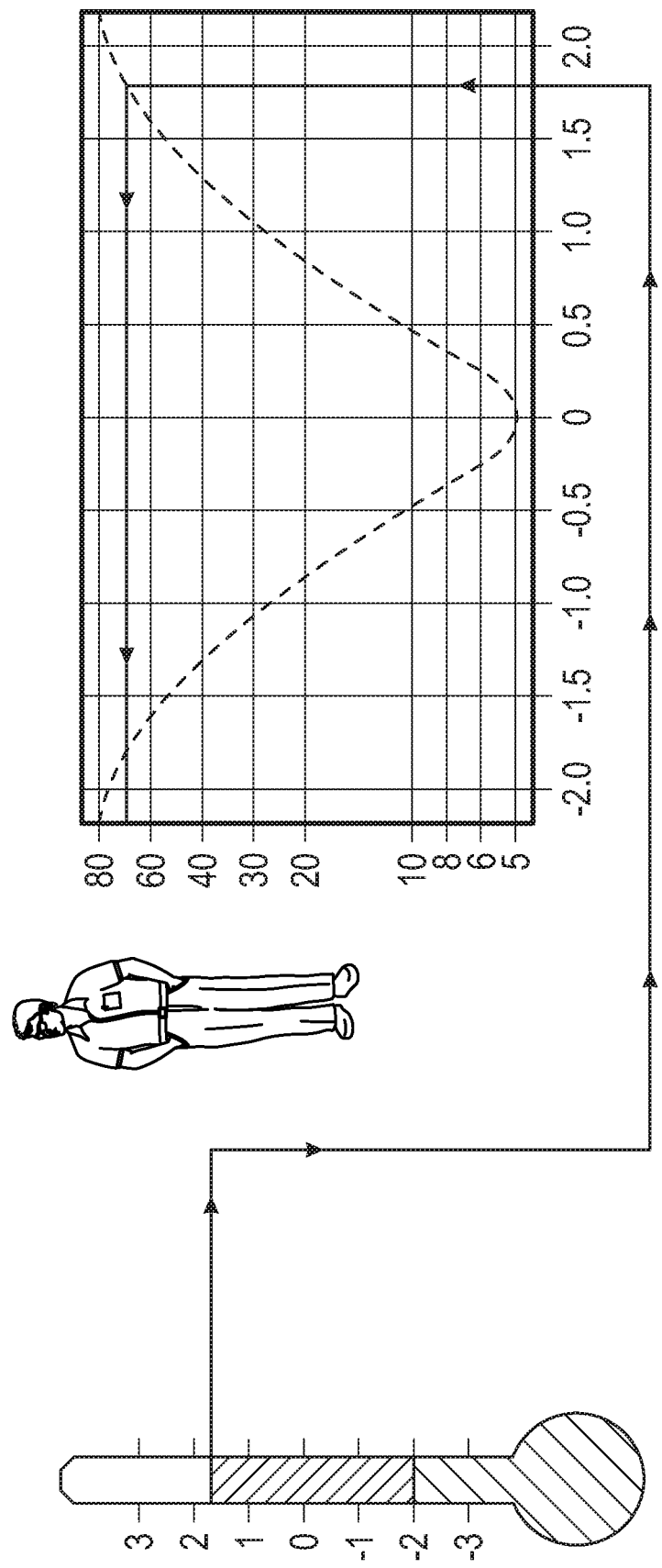
FIG. 2 is a graphical illustration showing a determination of the personal thermal comfort of a person in accordance with an embodiment.

With reference to FIG. 2, an exemplary embodiment is illustrated diagrammatically showing a representation of a PPD value for a determined PMV. As can be seen from this illustration, the PPD value is dependent on the PMV value. The PPD may be determined as a percentage value. Both the PMV and the PPD are dependent on the basal metabolic rate as can be seen from the above equations. As the desired air temperature in the vehicle 10 is controlled based on at least the determined basal metabolic rate, the personal indicator, e.g., PMV and/or PPD, that represents the perceived thermal comfort of each individual person and that is determined based on the metabolic rate can be considered when controlling the desired air temperature.

Figure 3:
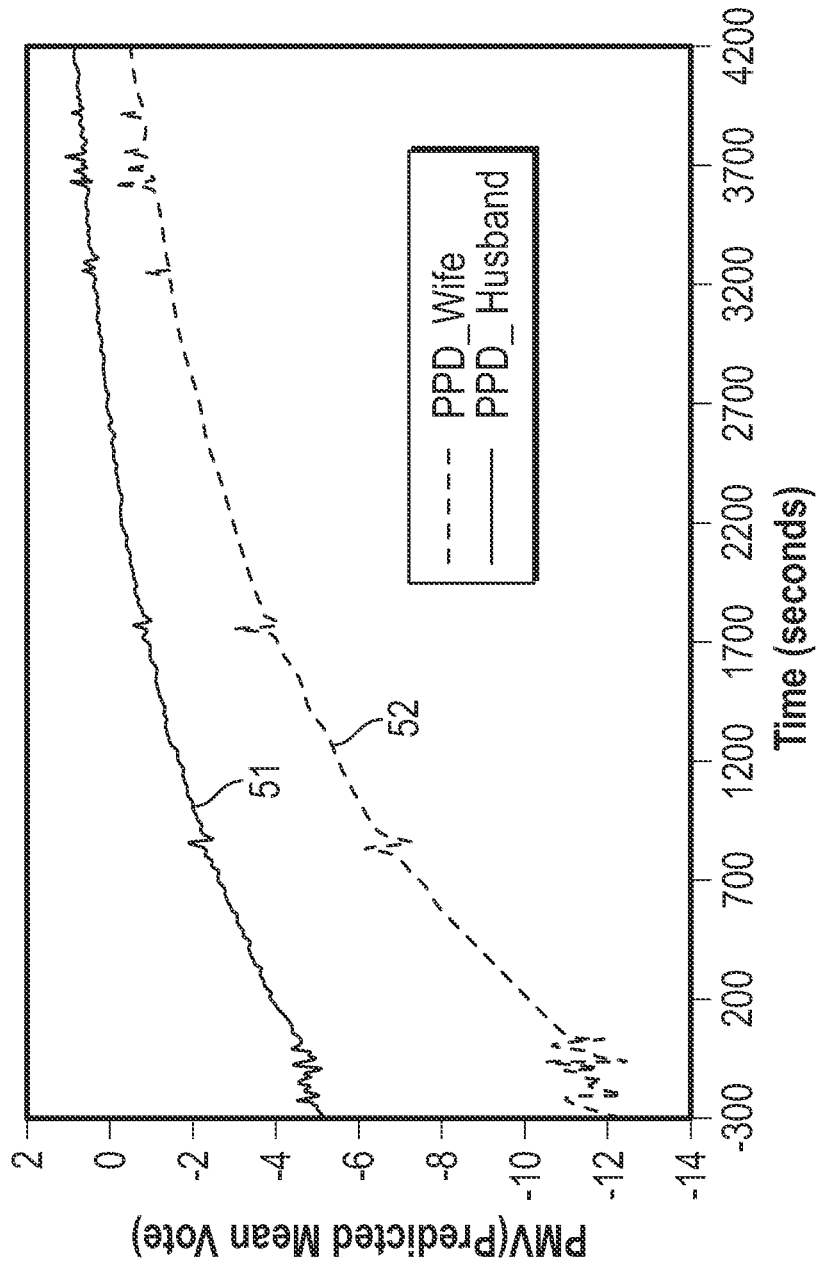
FIG. 3 is a graphical illustration for an influence of personal factors on the personal thermal comfort of a person in accordance with an embodiment.
Figure 4:
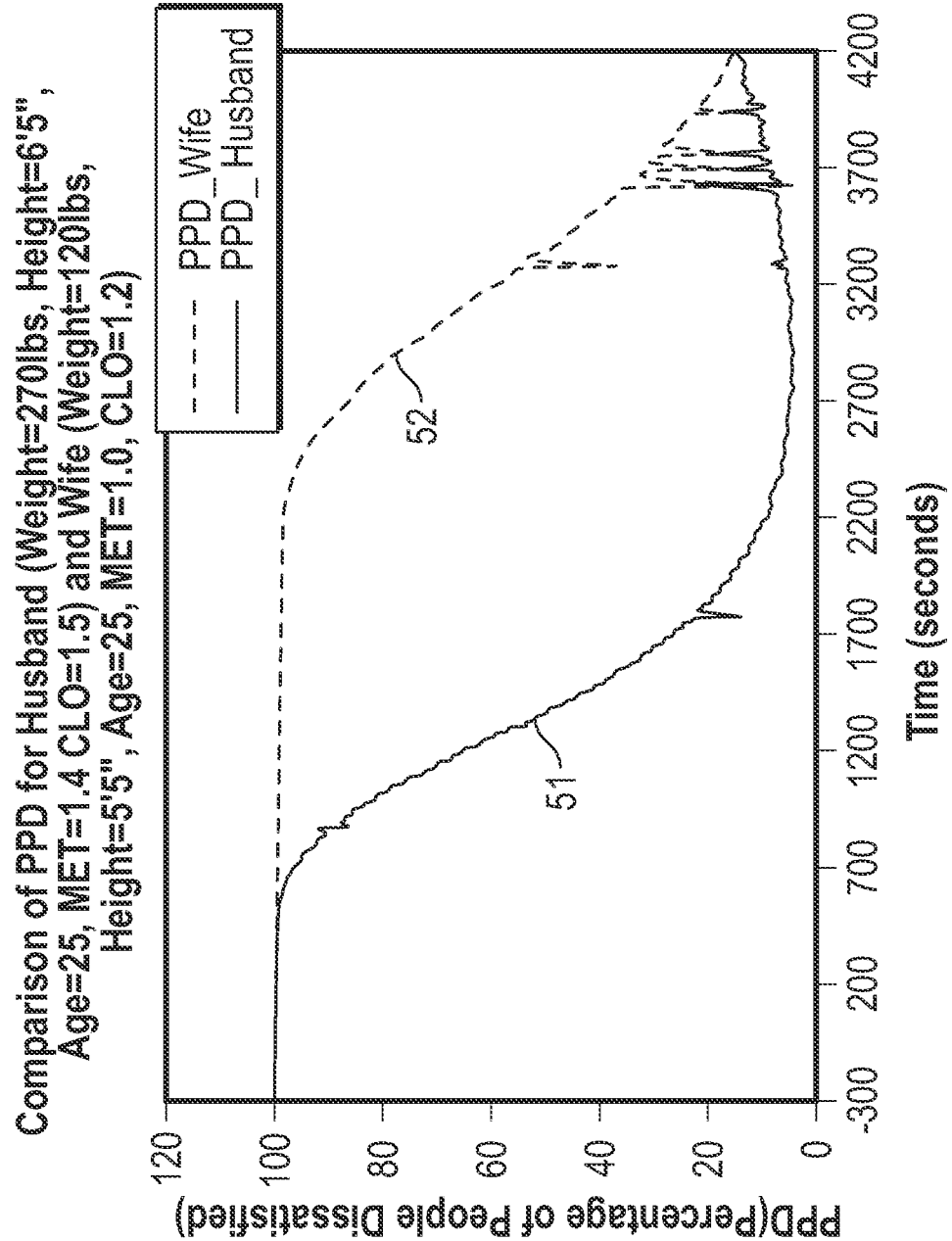
FIG. 4 is another graphical illustration for an influence of personal factors on the personal thermal comfort of a person in accordance with an embodiment.

With reference to FIGS. 3 and 4, exemplary embodiments for a variation of the PMV value and the PPD value over time are illustrated for different gender. As can be seen from these illustrations, at least the weight, height, age, activity level (MET) and clothing (CLO) have an influence on the PMV and PPD over time for each individual person. As can also be seen, the PMV over time is significantly different for men 51 and women 52. FIGS. 3 and 4 provide example values for the personal factors weight, height, age, activity level, and clothing information, both for a man (husband) and a woman (wife). Although the external thermal environment for both men and women is the same, the perceived thermal comfort is very different. It is noted that $T_{EHT}$, however, is identical for both men and women when the external environment is the same.

In an exemplary embodiment, the person may input her or his personal biometric data including a weight, a height, an age and/or a gender. The person may input these data via input unit 35. The biometric data of the person may also be obtained by sensor devices 40a-40n, for example optical sensors, pressure sensors, weight sensors, temperature sensors etc. Based on the input or sensed biometric data, the processor 44 can then determine the basal metabolic rate associated with the person.

In an exemplary embodiment, the basal metabolic rate associated with the person is determined using at least one of a weight of the person, a height of the person, an age of the person and a gender of the person. For example, the basal metabolic rate can be determined or estimated based on the Harris-Benedict Formula as follows:

$$BMR(Male)=0.04843*(13.4*Weight+4.8*Height-5.68*Age+88.4)$$

$$BMR(Female)=0.04843*(9.25*Weight+3.1*Height-4.33*Age+447.6)$$

As can be seen from these equations, the basal metabolic rate is differently determined for men and women and is therefore dependent on the gender of person.

In an exemplary embodiment, the processor 44 determines an amount of heat energy emitted by the person located in the compartment of the vehicle 10, wherein the desired air temperature in the vehicle 10 is further controlled based on the determined amount of heat energy emitted by the person, i.e., the desired air temperature in the vehicle 10 is controlled based on the determined amount of heat energy emitted by the person and the determined basal metabolic rate. In particular, the personalized indicator, i.e. the PMV or PPD of a person, based on which the desired air temperature in the vehicle may be controlled can be determined based on a basal metabolic rate specific for that person and a heat energy emitted by that person at a certain time.

In an exemplary embodiment, the processor 44 can determine the amount of heat energy emitted by the person based on an information of a work done (W) by a movement of the person. This can be a movement carried out by the person inside the vehicle 10. Thus, a generation of heat energy by a movement of the person can be considered for determining PMV and PPD. For example, the value for W may be mostly set to substantially zero since a passenger driving in a vehicle does usually not move.

Additionally or alternatively, the processor 44 can determine the amount of energy emitted by the person using a clothing information associated with the person, wherein the clothing information associated with the person is determined using at least one of a clothing temperature information ($t_{cl}$), a clothing insulation information ($I_{cl}$) and an information about a clothing-specific heat transfer coefficient ($h_c$). In this case, the processor determines the amount of energy emitted by the person using the clothing information by receiving an input from the person via input unit 35, wherein the input is indicative for a clothing type worn by the person, or by using a default setting for the clothing information, if no input is received from the user via the input unit or if the input from the person is invalid. The input of the person may be carried out using input devices 35a-35n. For example, the user may input a type of clothing that she or he currently wears into the input unit 35, e.g., a display on which different clothing types are shown. The person can thus select among the shown clothing types and the processor 44 subsequently allocates the inputs from the user to predetermined values for the clothing temperature information ($t_{cl}$), the clothing insulation information ($I_{cl}$) and the information about a clothing-specific heat transfer coefficient ($h_c$). If there is no input or selection by the person, the processor 44 uses a default value so that the emitted heat energy and thus the PMV and PPD can nevertheless be calculated.

The same may apply to determining the basal metabolic rate. In particular, the processor 44 may determine the basal metabolic rate based on data stored on a non-transitory computer readable medium (not shown) if such data is available on the non-transitory computer readable medium. If no such data is available from the non-transitory computer readable medium, the processor 44 can instead determine the basal metabolic rate using default data from a data storage device 32, wherein this default data includes pre-stored biometric data of the person.

In an exemplary embodiment, the amount of energy emitted by the person is representative for a heat energy which is transferred from the person into the compartment 15 of the vehicle 10 in which the person is located. As described above, the basal metabolic rate of the person as well as the clothing of the person and the work done by of the person can have an influence on the heat emitted by the person and therefore also on the personal thermal comfort of the person which is indicated by the PMV and PPD. The basal metabolic rate which is specific for an individual or person has an influence on the personal perception of temperature by the person and therefore on a current well-being of the person. The provided vehicle 10, in particular the temperature regulation in the vehicle 10, can thus improve the personal well-being of a person at different times.

In an exemplary embodiment, the processor 44 determines the temperature value that is representative for the current thermal environment in the compartment 15 of the vehicle 10 using a mathematical model that is based on a heat balance of the compartment 15 of the vehicle 10. As explained above, the equivalent homogenous temperature $T_{EHT}$ is used to provide the temperature value that is representative for the current thermal environment in the compartment 15. The temperature value $T_{EHT}$ represents a current thermal environment in the vehicle 10, preferably a uniform thermal environment or temperature in the vehicle 10.

In an exemplary embodiment, the temperature $T_{EHT}$ can be calculated as follows:

$$T_{EHT} = \left(\alpha + \gamma\sqrt{V_a}\right)T_{air} + \beta T_{wall} - \gamma\sqrt{V_a}\, T_{skin} +$$
$$\left(\frac{1 + 1.395 * Iclo_0}{1 + 1.395 * Iclo} - 1\right)(T_{skin} - T_{EHT0}) + \frac{\mu Q_{solar\text{-}occ}}{(1 + 1.395 * Iclo)A_{occ}}$$

where:
$V_a$ represents air velocity,
$T_{air}$ represents air temperature,
$T_{wall}$ represents wall temperature,
$T_{skin}$ represents skin temperature,
$Iclo_0$ represents parameters indicative of a clothing insulation,
Iclo represents parameter indicative of a clothing insulation,
$\alpha=0.7$,
$\beta=0.3$,
$\gamma=0.55$,
$T_{EHT0}$ represents constant value,
$\mu$ represents constant value,
$A_{occ}$ represents vehicle occupants surface area (nude area),
$Q_{solar,occ}$ represents rate of incident solar energy on the occupant.

In an exemplary embodiment, the temperature value $T_{EHT}$ represents a current thermal environment in the vehicle 10, preferably a uniform thermal environment or temperature in the vehicle 10. The thermal environment can be represented by a uniform temperature of an imaginary enclosure of the vehicle 10 having an air velocity equal to zero in which a person will exchange the same dry heat by radiation and convection as in an actual non-uniform or real environment. In detail, a real or non-uniform environment in the vehicle 10 has a given air temperature $T_{air}$, a given air velocity $V_{air}$, a given wall temperature $T_{wall}$ of components inside the vehicle 10, i.e., inside the compartment 15 of the vehicle 10, a given solar load or heat radiation from components inside the vehicle 10. Furthermore, if the person is located inside the vehicle 10, the real or non-uniform environment further has a heat source, i.e. the person itself, such that an amount of heat $Q_n$ is emitted from the person into the vehicle 10. As explained above, this heat emission is based, for example, on clothing information or the basal metabolic rate of the person. To calculate the $T_{EHT}$, the real or non-uniform environment is transformed into a uniform environment having predetermined boundary conditions. In detail, the uniform environment is imagined as a closed system in which the following applies: $T_{air}=T_{wall}=T_{EHT}$ and $V_{air}=0$. Furthermore, it is assumed that the amount of heat $Q_u$ emitted from the person in the uniform environment is equal to the amount of heat $Q_n$ emitted by the person in the non-uniform environment. Based on these boundary conditions and the above explained equation, a value for $T_{EHT}$ can be calculated by the processor 44 of the vehicle 10. In other words, the thermal environment can be represented by a uniform temperature of an imaginary enclosure (closed system) of the vehicle 10 having an air velocity equal to zero in which a person will exchange the same dry heat by radiation and convection as in an actual non-uniform or real environment. $T_{EHT}$ therefore represents a simplified representation of a temperature condition inside the vehicle 10. In particular, $T_{EHT}$ provides a single representative value to characterize a non-uniform or real thermal environment into a uniform thermal environment. $T_{EHT}$ thus represents a simplified representation of a current temperature condition inside the vehicle 10. $T_{EHT}$ may thus be estimated in real-time to determine the PMV and/or the PPD. The determined PMV and/or PPD can then be used as feedback variables to control the desired air temperature in the vehicle 10. Thus, PMV and/or PPD can replace the usage of a breath air parameter, in particular a breath air temperature, as a feedback variable. In summary, $T_{EHT}$ characterizes the thermal environment of the vehicle 10, in particular inside the compartment 15 of the vehicle 10, and the PMV and/or PPD account for personal factors of the person located in the vehicle 10. Based on these parameters, the desired air temperature can be controlled.

In an exemplary embodiment, the processor 44 controls the desired air temperature in the vehicle 10 such that the desired air temperature is within a temperature range that is determined based on an information about a personalized thermal comfort of the person perceiving the desired air temperature. This information about a personalized thermal comfort may be represented by the PMV and PPD as described above. As illustrated in FIG. 2, the percentage value for PPD is indicative of the personal thermal comfort of person. In order to provide a maximum PPD, a desired air temperature in the vehicle 10 should be within a certain temperature range, i.e., the desired air temperature in the vehicle 10 should not fall below a lower threshold value indicating when it is too cold in the vehicle 10 and should also not exceed an upper threshold value indicating when it is too hot in the vehicle 10. Basing this determination on the PMV and the PPD allows to consider the personal perception of an individual person. As such, the processor 44 can consider personal factors of each individual person in the vehicle 10 to control the desired temperature which is most comfortable for the respective person. This also reduces energy consumption of the overall temperature control in the vehicle 10.

In an exemplary embodiment, the processor 44 controls the desired air temperature in the vehicle 10 by adjusting an air flow rate into the vehicle 10. The adjustment of the air flow rate into the vehicle 10 can be controlled by actuator device 42a. The processor 44 may control the desired air temperature in the vehicle 10 by further adjusting a temperature of the air flow into the vehicle 10. The adjustment of the air flow rate into the vehicle can be controlled by actuator device 42a, whereas the temperature of the air flow can be controlled by another actuator device 42b. Further actuator devices 42n can be added to regulate the temperature independently in different temperature zones inside the vehicle 10 as will be explained in more detail below.

In an exemplary embodiment, controlling the desired air temperature in the vehicle 10 results in an adjustment of the desired air temperature in the compartment 15 of the vehicle 10, wherein the adjusted desired air temperature in the compartment 15 of the vehicle 10 provides a basis for again determining, by the processor 44, a current temperature condition in the vehicle 10 such that a closed-loop temperature control in the vehicle 10 is provided. In particular, the determined PMV and the PPD are used as feedback variables for the temperature control, i.e., for an automated climate control, in the vehicle 10. The term "again" may be understood in a way that the current temperature condition is determined another or a second time. This process can be repeated in an iterative manner until a final desired temperature is adjusted which satisfies the thermal comfort need of the person. Since the personalized indicator, e.g. PMV or PPD, may be determined based on the amount of energy generated by the person, the personalized indicator may change or vary over time, for example when a work done (W) by a movement of the person occurs. As the personalized indicator changes, the desired air temperature in the vehicle 10 may also change accordingly.

Figure 5:
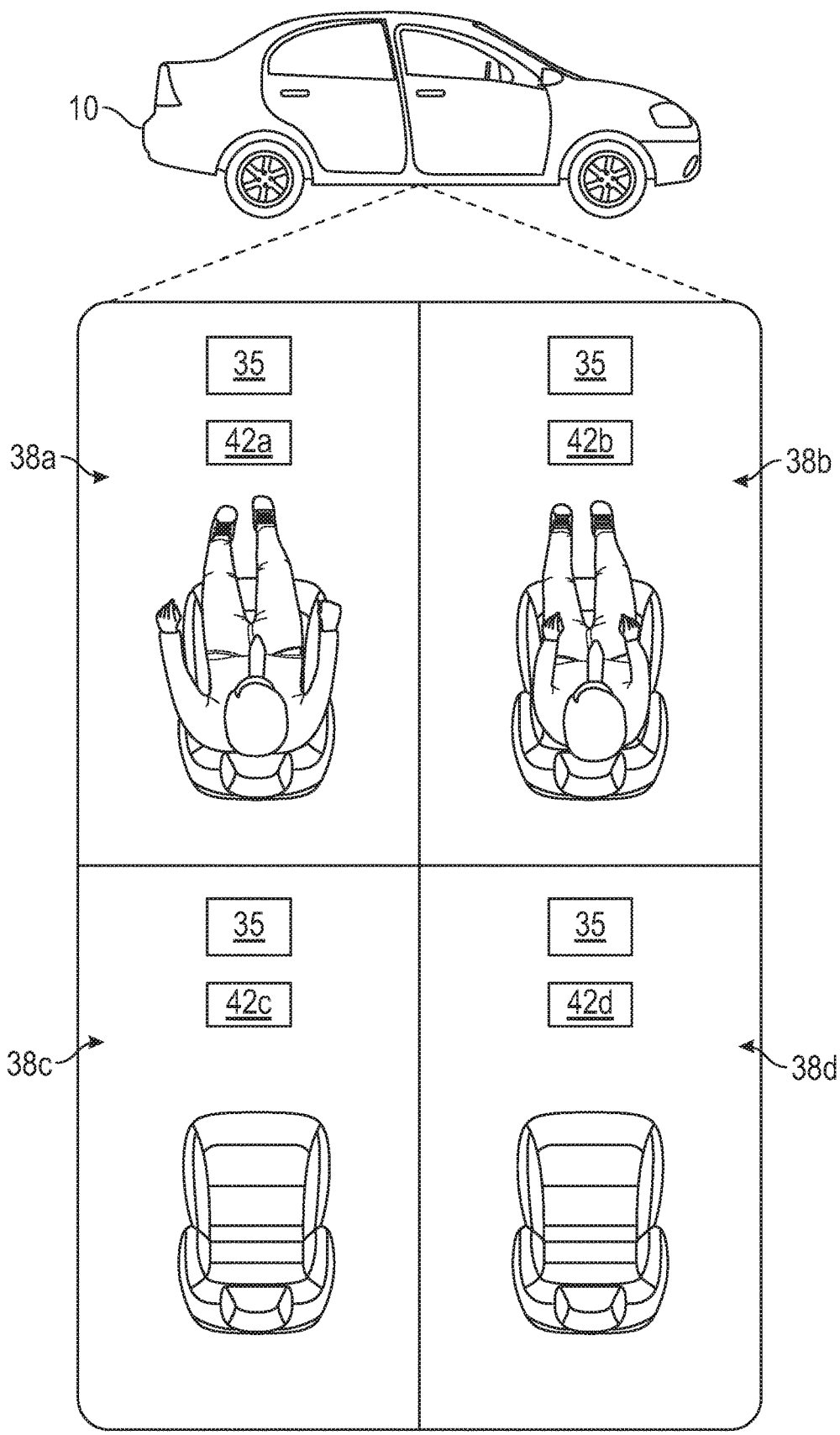
FIG. 5 is a vehicle having separate temperature zones for an individual personalized controlling of an air temperature in the vehicle in accordance with an embodiment.

With reference now to FIG. 5, an exemplary embodiment of the vehicle 10 is illustrated, where the processor 44 virtually divides the compartment 15 of the vehicle 10 into a first temperature zone 38a and a second temperature 38b zone within the vehicle 10. The processor 44 determines a first basal metabolic rate that is specific for a first person a located in the first temperature zone 38a of the vehicle 10. The processor 44 further determines a second basal metabolic rate that is specific for a second person located in the second temperature zone 38b of the vehicle 10. The processor 44, in particular the actuator device 42a connected to the processor 44, controls a first desired air temperature in the first temperature zone 38a of the vehicle 10 based on the determined first basal metabolic rate of the first person located in the first temperature zone 38a of the vehicle 10 and the determined current temperature condition in the vehicle 10. Furthermore, the processor 44 controls a second desired air temperature in the second temperature zone 38b of the vehicle 10 based on the determined second basal metabolic rate of the second person located in the second temperature zone 38b of the vehicle 10 and the determined current temperature condition in the vehicle 10. The required biometric data for determining the basal metabolic rates of persons can be input via the one or more input units 35. It is noted that sensor devices 40a-40n may be used to obtain the data, e.g. biometric data, for determining the different basal metabolic rates of different persons located in the vehicle 10.

Again, with reference to FIG. 5, an exemplary embodiment of the vehicle 10 is illustrated, where the processor 44 further divides the compartment 15 of the vehicle 10 into a first temperature zone 38a, a second temperature 38b, a third temperature zone 38c and a fourth temperature zone 38d. The processor 44 can divide the compartment 15 into temperature zones 38a, 38b, 38c and 38d by defining separate spaces in the vehicle, wherein each space has distinct dimensions and wherein in each space is allocated to at least one person, e.g., each space is allocated to a different person. This definition of spaces or temperature zones 38a, 38b, 38c and 38d can be imagined as a virtual division of the compartment 15 such that the control of the desired air temperature in the vehicle leads to a substantially homogeneous temperature provided in the first temperature zone 38a, and, simultaneously, to a substantially homogeneous temperature provided in the second temperature zone 38b different from the substantially homogeneous temperature in the first temperature zone 38a, etc. For example, there is not a physical separation in the compartment 15, but rather a virtual separation established by the differently controlled air temperatures in the separated temperature zones 38a, 38b, 38c and 38d. The dividing of the temperature zones 38a, 38b, 38c and 38d can be carried out automatically by processor 44. The concept described above can be applied to an arbitrary number of temperature zones 38a-38n, i.e., spaces, in the vehicle 10. The processor 44, in particular the actuator devices 42a-42n connected to the processor 44, control respective desired air temperatures in the different temperature zones 38a-38n of the vehicle 10 based on respectively determined personalized indicators of persons located in the respective temperature zones 38a-38n of the vehicle 10 and the determined current temperature condition in the vehicle 10. The processor 44 may independently control the first desired air temperature in the first temperature zone 38a of the vehicle and the second desired air temperature in the second temperature zone 38b of the vehicle, etc.

FIG. 1 also shows a system 11 for personalized controlling of an air temperature in the vehicle 10. The system 11 includes a non-transitory computer readable medium (not shown) that stores user entered parameters associated with at least one of a weight of a person, a height of the person, an age of the person and a gender of the person. The system 11 includes a processor 44 configured to determine a current temperature condition in the vehicle 10, wherein the current temperature condition in the vehicle 10 is determined based on at least a temperature value that is representative for a current thermal environment in a compartment 15 of the vehicle 10. The processor 44 is configured to determine a basal metabolic rate associated with a person in the compartment 15 of the vehicle 10. The processor 44 is further configured to control a desired air temperature in the vehicle 10, wherein the desired air temperature is controlled based on the determined current temperature condition in the vehicle 10 and the determined basal metabolic rate.

Figure 6:
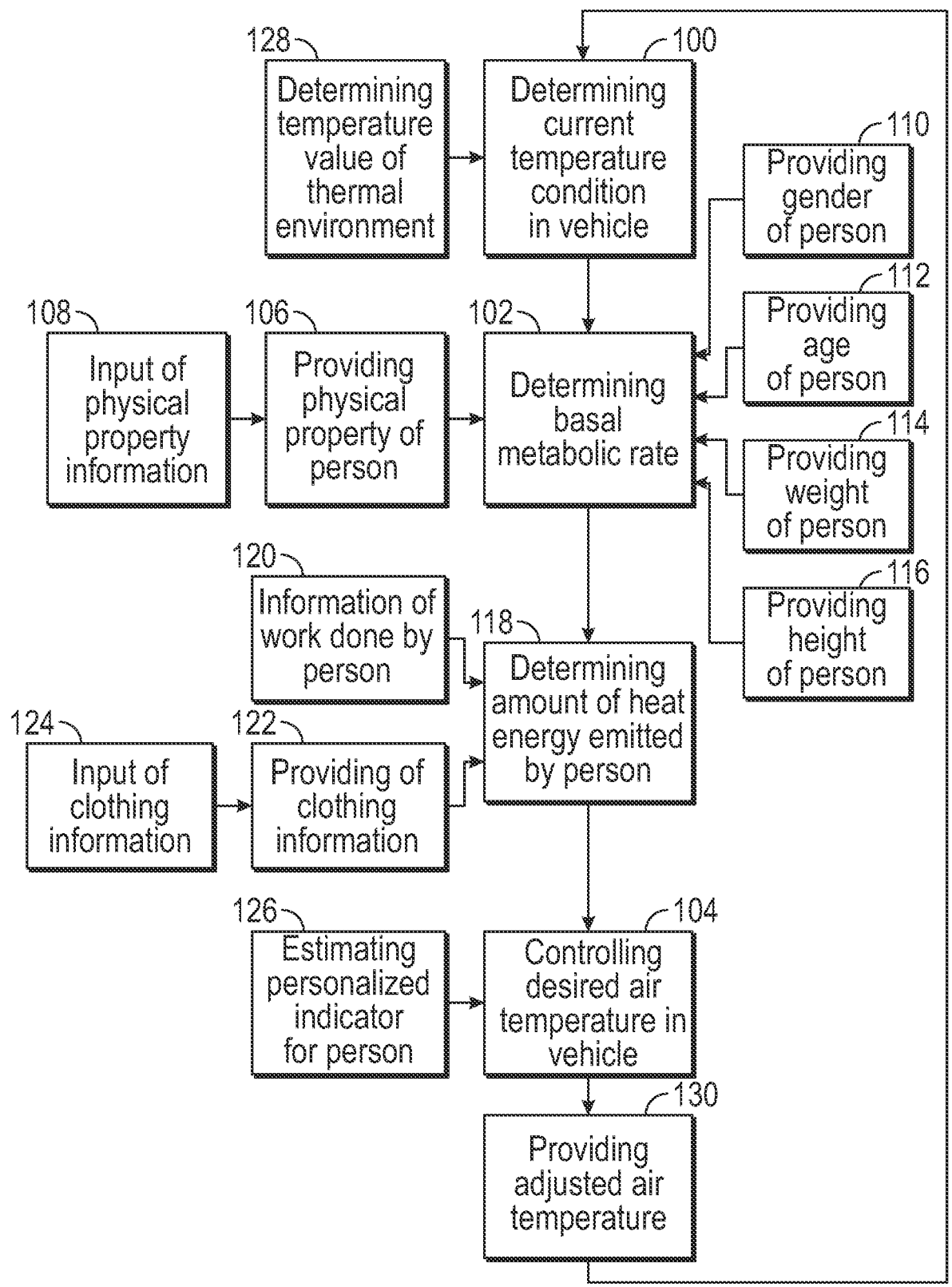
FIG. 6 is a block diagram of a method for personalized controlling of an air temperature in a vehicle in accordance with an embodiment.

FIG. 6 shows a block diagram of a method for personalized controlling of an air temperature in a vehicle, in particular in the vehicle 10 of FIG. 1 above. The principles, functions, definitions and features of the vehicle 10 and system 11 as described with reference to FIG. 1, also apply the method described in the following. The method includes several steps, wherein the sequential order of the steps can be arbitrarily varied if required. The sequence of the steps shown in FIG. 6 should be understood as an illustrative example.

In a step 100 of the method, a processor determines a current temperature condition in the vehicle, wherein the current temperature condition in the vehicle is determined based on at least a temperature value that is representative for a current thermal environment in a compartment of the vehicle. In a step 102, the processor determines a basal metabolic rate that is associated with a person located in the compartment of the vehicle. In another step 104 of the method, the processor controls a desired air temperature in the vehicle, wherein the desired air temperature is controlled based on the determined current temperature condition in the vehicle and the determined basal metabolic rate. The processor determines in step 106 the basal metabolic rate based on at least one parameter corresponding to a physical property of the person. An information of a physical property of the person is input via a user interface in step 108, wherein the processor determines the basal metabolic rate associated with the person using the information of the physical property of the person. In a step 110, the basal metabolic rate associated with the person is determined based on at least a gender of the person. In another step 112, the basal metabolic rate associated with the person is determined based on at least an age of the person. In another step 114, the basal metabolic rate associated with the person is determined based on at least a weight of the person. In another step 116, the basal metabolic rate associated with the person is determined based on at least a height of the person. In step 118, the processor determines an amount of heat energy emitted by the person located in the compartment of the vehicle, wherein the desired air temperature in the vehicle is further controlled in step 104 based on the determined amount of heat energy emitted by the person. In step 120, the processor determines the amount of heat energy emitted by the person based on an information of a work done by a movement of the person. In step 122, the processor determines the amount of energy emitted by the person using a clothing information associated with the person, wherein the clothing information associated with the person is determined using at least one of a clothing temperature information, a clothing insulation information and an information about a clothing-specific heat transfer coefficient. In step 124, an input unit receives an input from the person, wherein the input is indicative for a clothing type worn by the person. In step 126, the processor estimates a personalized indicator for the person that is indicative of a thermal comfort perceived by the person, wherein the personalized indicator is determined based on at least the determined basal metabolic rate that is associated with the person located in the compartment of the vehicle, wherein the processor determines in step 104 the desired air temperature in the vehicle based on the estimated personalized indicator. In step 128, the processor determines the value that is representative for the current thermal environment in the compartment of the vehicle using a mathematical model that is based on a heat balance of the compartment of the vehicle. In step 130, the processor controls the desired air temperature in the vehicle by adjusting the desired air temperature in the compartment of the vehicle, wherein the adjusted desired air temperature in the compartment of the vehicle provides a basis for again determining, by the processor, a current temperature condition in the vehicle such that a closed-loop temperature control in the vehicle is provided.

It is noted that steps 110, 112, 114 and 116 can be carried out substantially simultaneously to enable step 102. It is possible that steps 100, 102 and 118 are carried out before step 104 is carried out.

The vehicle 10 and/or the system 11, in particular the processor 44 of the vehicle 10 and/or of the system 11 of FIG. 1 may be configured to execute the method for personalized controlling of an air temperature in a vehicle as illustrated in FIG. 6.

Figure 7:
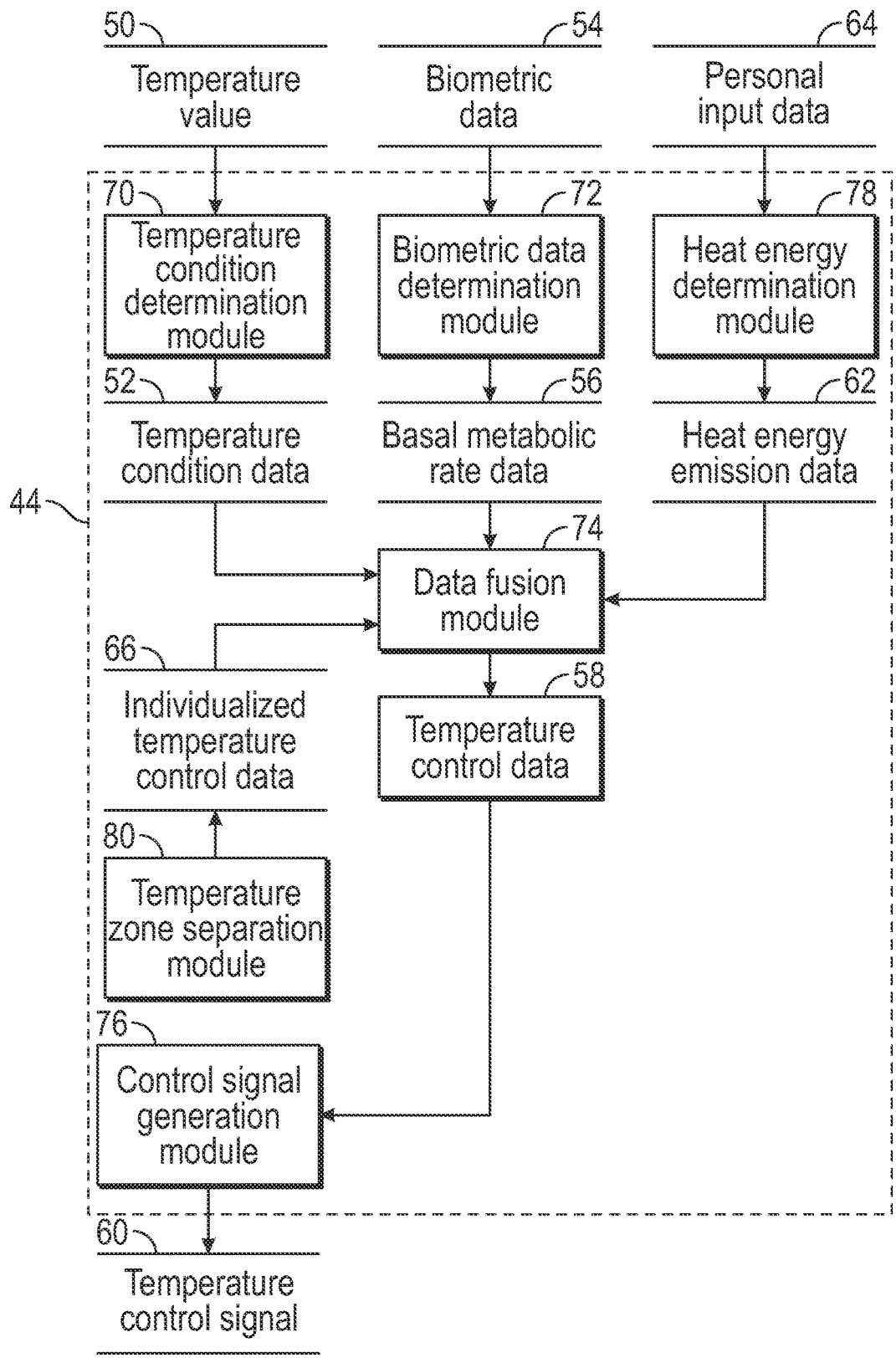
FIG. 7 is a schematic diagram showing a software architecture of the system of FIG. 1.

FIG. 7 illustrates a schematic diagram of a software architecture of the system 11 shown in FIG. 1 as it is executed by the processor 44. Therein, a temperature value 50 that is representative for a current thermal environment in a compartment of the vehicle is provided. A temperature condition determination module 70 determines current temperature condition data 52 in the vehicle based on the temperature value 50. A biometric data determination module 72 determines a basal metabolic rate that is associated with a person located in the compartment of the vehicle. Therefore, biometric data 54 is provided as input data to the biometric data determination module 72. The biometric data determination module 72 determines basal metabolic rate data 56 specific for the person located in the compartment of the vehicle. Data fusion module 74 fuses the determined current temperature condition data 52 and the determined basal metabolic rate data 56 to obtain and to provide temperature control data 58. Control signal generation module 76 uses this temperature control data 58 to provide a temperature control signal 60 in order to control a desired air temperature in the vehicle.

In an exemplary embodiment, the biometric data determination module 72 determines the basal metabolic rate based on at least one parameter corresponding to a physical property of the person, for example a gender of the person, an age of the person, a weight of the person and/or a height of the person.

In an exemplary embodiment, a heat energy determination module 78 may determine heat energy emission data 62 indicative of an amount of heat energy emitted by the person located in the compartment of the vehicle. Data fusion module 74 may then fuse the determined current temperature condition data 52, the determined basal metabolic rate data 56 and the heat energy emission data 62 to obtain and to provide temperature control data 58. Personal input data 64 may be provided by the person to the heat energy determination module 78, wherein the personal input data 64 may be indicative for a clothing type worn by the person.

In an exemplary embodiment, a temperature zone separation module 80 divides the compartment of the vehicle into a first temperature zone and a second temperature zone within the vehicle to provide individualized temperature control data 66 to the data fusion module 74. Data fusion module 74 may then fuse the determined current temperature condition data 52, the determined basal metabolic rate data 56, the heat energy emission data 62 and the individualized temperature control data 66 to obtain and to provide temperature control data 58 to the control signal generation module 76 such that an individualized temperature control of each individual temperature zone is carried out.

In an exemplary embodiment, six key factors may be considered as being responsible for thermal comfort, four environmental and two personal factors. The above described vehicle, system and/or method describe how to estimate thermal comfort unique to each occupant in a vehicle cabin in real-time, use it as a feedback variable in the closed-loop ACC system, and accordingly change airflow rate and discharge air temperatures thus providing thermal comfort unique to the vehicle occupant.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A computer implemented method for personalized controlling of an air temperature in a vehicle, comprising:
   determining, by a processor, a current temperature condition in the vehicle, wherein the current temperature condition in the vehicle is determined based on at least a temperature value that is representative for a current thermal environment in a compartment of the vehicle;
   determining, by the processor, a basal metabolic rate that is associated with a person located in the compartment of the vehicle;
   controlling, by the processor, a desired air temperature in the vehicle, wherein the desired air temperature is controlled based on the determined current temperature condition in the vehicle and the determined basal metabolic rate.

2. The method of claim 1, further comprising:
   determining, by the processor, the basal metabolic rate based on at least one parameter corresponding to a physical property of the person.

3. The method of claim 1, further comprising:
   receiving, via a user interface, an information of a physical property of the person; and
   determining, by the processor, the basal metabolic rate associated with the person using the received information of the physical property of the person.

4. The method of claim 1,
wherein the basal metabolic rate associated with the person is determined based on at least a gender of the person.

5. The method of claim 1,
wherein the basal metabolic rate associated with the person is determined based on at least an age of the person.

6. The method of claim 1,
wherein the basal metabolic rate associated with the person is determined based on at least a weight of the person.

7. The method of claim 1,
wherein the basal metabolic rate associated with the person is determined based on at least a height of the person.

8. The method of claim 1, further comprising:
determining, by the processor, an amount of heat energy emitted by the person located in the compartment of the vehicle,
wherein the desired air temperature in the vehicle is further controlled based on the determined amount of heat energy emitted by the person.

9. The method of claim 8, further comprising:
determining, by the processor, the amount of heat energy emitted by the person based on an information of a work done by a movement of the person.

10. The method of claim 8,
determining, by the processor, the amount of energy emitted by the person using a clothing information associated with the person,
wherein the clothing information associated with the person is determined using at least one of a clothing temperature information, a clothing insulation information and an information about a clothing-specific heat transfer coefficient;
determining, by the processor, the amount of energy emitted by the person using the clothing information by:
receiving an input from the person via an input unit, wherein the input is indicative for a clothing type worn by the person; or
using a default setting for the clothing information, if no input is received from the user via the input unit or if the input from the person is invalid.

11. The method of claim 1,
estimating, by the processor, a personalized indicator for the person that is indicative of a thermal comfort perceived by the person, wherein the personalized indicator is determined based on at least the determined basal metabolic rate that is associated with the person located in the compartment of the vehicle;
controlling, by the processor, the desired air temperature in the vehicle based on the estimated personalized indicator.

12. The method of claim 1, further comprising:
Determining, by the processor, the temperature value that is representative for the current thermal environment in the compartment of the vehicle using a mathematical model that is based on a heat balance of the compartment of the vehicle.

13. The method of claim 1,
wherein controlling the desired air temperature in the vehicle results in an adjustment of the desired air temperature in the compartment of the vehicle, wherein the adjusted desired air temperature in the compartment of the vehicle provides a basis for again determining, by the processor, a current temperature condition in the vehicle such that a closed-loop temperature control in the vehicle is provided.

14. The method according to claim 1, further comprising:
Dividing, by the processor, the compartment of the vehicle into a first temperature zone and a second temperature zone within the vehicle;
Determining, by the processor, a first basal metabolic rate that is associated with a first person located in the first temperature zone of the vehicle;
Determining, by the processor, a second basal metabolic rate that is associated with a second person located in the second temperature zone of the vehicle;
Controlling, by the processor, a first desired air temperature in the first temperature zone of the vehicle based on the determined first basal metabolic rate of the first person located in the first temperature zone of the vehicle and the determined current temperature condition in the vehicle;
Controlling, by the processor, a second desired air temperature in the second temperature zone of the vehicle based on the determined second basal metabolic rate of the second person located in the second temperature zone of the vehicle and the determined current temperature condition in the vehicle.

15. A system for personalized controlling of an air temperature in a vehicle, comprising:
a non-transitory computer readable medium that stores user entered parameters associated with at least one of a weight of a person, a height of the person, an age of the person and a gender of the person; and
a processor configured to determine a current temperature condition in the vehicle, wherein the current temperature condition in the vehicle is determined based on at least a temperature value that is representative for a current thermal environment in a compartment of the vehicle,
to determine a basal metabolic rate that is associated with a person located in the compartment of the vehicle;
to control a desired air temperature in the vehicle, wherein the desired air temperature is controlled based on the determined current temperature condition in the vehicle and the determined basal metabolic rate.

16. The system of claim 15,
wherein the processor is further configured to determine the basal metabolic rate based on at least one physical property of the person,
wherein data for the physical property of the person is obtained from the non-transitory computer readable medium that stores the user entered parameters when a temperature control of the vehicle is activated.

17. The system of claim 16, further comprising:
a data storage device coupled to the vehicle,
wherein the processor is further configured to determine the basal metabolic rate based on the at least one physical property of the person,
wherein data for the physical property of the person is obtained from the non-transitory computer readable medium if such data is available on the non-transitory computer readable medium, and
wherein data for the physical property of the person is obtained as default data from the data storage device if data for the physical property of the person is not available on the non-transitory computer readable medium.

18. The system of claim 15,
wherein the processor is further configured to determine an amount of heat energy emitted by the person into the compartment of the vehicle.

19. The system of claim 18,
wherein the processor is further configured to determine the amount of heat energy emitted by the person based on an information of a work done by a movement of the person and a clothing information associated with the person, wherein the clothing information associated with the person is determined using at least one of clothing temperature information, a clothing insulation information and information about a clothing-specific heat transfer coefficient.

20. A vehicle, comprising:
a processor configured to determine a current temperature condition in the vehicle, wherein the current temperature condition in the vehicle is determined based on at least a temperature value that is representative for a current thermal environment in a compartment of the vehicle,
to determine a basal metabolic rate that is associated with a person located in the compartment of the vehicle;
to control a desired air temperature in the vehicle, wherein the desired air temperature is controlled based on the determined current temperature condition in the vehicle and the determined basal metabolic rate.

* * * * *